United States Patent [19]
Moriya

[11] Patent Number: 6,067,049
[45] Date of Patent: May 23, 2000

[54] RECEPTION APPARATUS

[75] Inventor: Masahiro Moriya, Yokohama, Japan

[73] Assignee: Matsushita Electric Industrial Co., Ltd., Osaka, Japan

[21] Appl. No.: 09/158,792

[22] Filed: Sep. 23, 1998

[30] Foreign Application Priority Data

Oct. 3, 1997 [JP] Japan ................................ 9-287942

[51] Int. Cl.$^7$ ................................ G01S 5/02; G01S 3/52
[52] U.S. Cl. ........................... 342/418; 342/104; 342/115
[58] Field of Search ................................ 342/418, 104, 342/115

[56] References Cited

U.S. PATENT DOCUMENTS 4,114,155   9/1978   Raab .

FOREIGN PATENT DOCUMENTS 6-21903   1/1994   Japan .

OTHER PUBLICATIONS

English Language Abstract of JP No. 6–21903.

*Primary Examiner*—Theodore M. Blum
*Attorney, Agent, or Firm*—Greenblum & Bernstein, P.L.C.

[57] ABSTRACT

Level crossing number counter section 115 obtains the Doppler frequency caused by fading by counting the number of times of a received signal crossing an averaged received signal level. Corresponding to the Doppler frequency, reference signal correlation integration control section 116 controls reference signal correlation integration section 311 to suspend and restart the processing of integrating the correlation data of the received signal obtained in reference signal correlation section 306 with a reference signal.

12 Claims, 4 Drawing Sheets

RECEPTION APPARATUS

BACKGROUND OF THE INVENTION

1. Field of the Invention

The present invention relates to a reception apparatus capable of reducing the consumed electric power, particularly a reception apparatus using a code division multiple access system in which communication information is multiplied by a spreading code to transmit, and the communication information is obtained at a reception side by multiplying a received signal by the same spreading code as a transmission side.

2. Description of the Related Art

A code division multiple access (CDMA) system is standardized in U.S.A. for a cellular mobile telephone as IS 95. The basic research and practical research of CDMA techniques have been carried out widely as an advantageous access system in the public terrestrial mobile telephone system.

A CDMA system is a communication system having the resistance to noise, in which a plurality of orthogonal (low cross-correlation) spreading codes are used to communicate in the same frequency band, and a multiple use of the frequency band allows an increase in system capacity.

FIG. 1 illustrates a block diagram of a conventional mobile radio terminal apparatus (hereinafter described as mobile station) and the explanation is given below. FIG. 1 is a schematic configuration diagram of a mobile station in IS95 system in a CDMA mobile radio system.

A signal received by antenna 301 (received signal) is inputted to frequency conversion section 302. Frequency conversion section 302 frequency multiplying the received signal by a frequency (sine wave) outputted from frequency synthesizer section 304 to convert into an intermediate frequency band from a radio frequency band with respect to the received signal. The frequency converted received signal is outputted to quadrature demodulation section 303.

A signal transmitted from a base station (not shown) or a received signal when no influence by fading in a transmission path and no multi-path delayed versions is expressed in the formulation (1) below, $$\text{(Received Signal)} = \{Wd(t) \cdot D(t) + Wp(t)\} \times \{PNi(t) \cdot \cos(\omega ct) + PNq(t) \cdot \sin(\omega ct)\} \quad (1)$$

where reference signals are PNi(t) and PNq(t), an amplitude of a reference signal is Wp(t), a carrier frequency of a base station is ωC, information symbol is D(t), and channel identifying code is Wd(t), in this case one channel is used for the simplified explanation.

Quadrature demodulation section 303 multiplies a received signal by a signal of cos (ωct+φ) and a signal of sin (ωct+φ) each outputted from frequency synthesizer section 304 for the low pass filtering processing, and generates I channel baseband signal I (t) and Q channel baseband signal Q(t) expressed in the formulations (2) and (3) below, $$I(t) = \tfrac{1}{2}\{Wd(t) \cdot D(t) + Wp(t)\} \times \{PNi(t) \cdot \cos \phi - PNq(t) \cdot \sin \phi\} \quad (2)$$

$$Q(t) = \tfrac{1}{2}\{Wd(t) \cdot D(t) + Wp(t)\} \times \{PNi(t) \cdot \sin \phi + PNq(t) \cdot \cos \phi\} \quad (3)$$

where φ indicates a phase difference between a carrier of a mobile station and a carrier of a base station.

Analogue I channel baseband signal I(t) generated in quadrature demodulation section 303 is converted into a digital signal in A/D(Analogue/Digital) conversion section 305a. Analogue Q channel baseband signal Q(t) generated in quadrature demodulation section 303 is converted into a digital signal in A/D conversion section 305b. Both digital signals are outputted to reference signal correlation section 306, frequency difference detection section 313, and reception AGC control section 314.

Frequency difference detection section 313 detects a phase difference φ in carriers between a mobile station and a base station, and adjusts a frequency in frequency synthesizer section 304 to a predetermined value using a control value to cancel the phase difference φ.

Reception AGC (Automatic Gain Control) control section 314 calculates the time average of each of digital baseband signals I(t) and Q(t) to obtain a received signal level, and controls the reception gain in frequency conversion section 302 using a control value for keeping the received signal level constant. Thus, in frequency conversion section 302, the output level is held constant not depending on the variations of input level, which keeps the received signal level constant.

Reference signal correlation section 306 is to detect the correlation of a received signal and a reference signal. To detect the correlation is to multiple the received signal by the reference signal. The correlation is detected to remove the reference signal by multiplying transmission data by the reference signal again because the transmission data from a base station is multiplied by the reference signal already to transmit.

To multiply as decried above is to obtain an exclusive OR of a received signal and a signal of cos (ωct+φ) or a signal of sin (ωct+φ) in an EXOR circuits (exclusive-OR circuits ) 303a and 303b illustrated in quadrature demodulation section 303, or to multiple 0 by 1 in data after converting 0 and 1 into +1 and −1 respectively. This manner is the same as in the following explanation.

Further by multiplying a received signal by a reference signal to detect the correlation, the timing of the reference signal included in the received signal can be detected. And the detection of the timing allows a mobile station to acquire the synchronization with a base station with respect to signals.

That is, reference signal correlation section 306 detects the correlation expressed in the formulation (4) below by multiplying a received signal by reference signals PNi(t) and PNq(t) generated in reference signal generation section 307.

$$\begin{bmatrix} Ipn(t) \\ Qpn(t) \end{bmatrix} = \begin{bmatrix} PNi(t) + PNq(t) & -PNi(t) + PNq(t) \\ PNi(t) - PNq(t) & PNi(t) + PNq(t) \end{bmatrix} \times \begin{bmatrix} I(t) \\ Q(t) \end{bmatrix} \quad (4)$$

In this correlation processing, Ipn(t) and Qpn(t) signals (correlation signal) indicative of the correlation of each of digital baseband signals I(t) and Q(t) and reference signals PNi(t) and PNq(t) respectively are outputted to channel identification code correlation section 308 and reference signal correlation integration section 311. Correlation signals Ipn(t) and Qpn(t) are expressed in the formulations (5) and (6) below.

$$Ipn(t) = \{Wd(t) \cdot D(t) + Wp(t)\}(\cos \phi - \sin \phi) \quad (5)$$

$$Qpn(t) = \{Wd(t) \cdot D(t) + Wp(t)\}(\cos \phi + \sin \phi) \quad (6)$$

Channel identification code correlation section 308 multiplies channel identification code Wd(t) generated in channel identification code generation section 309 by correlation signals Ipn(t) and Qpn(t) (herein obtains exclusive-OR in EXOR circuits 308a and 308b) to detect the correlation of channel identification code Wd(t) and a received signal. The obtained correlation signals IW(t) and QW(t) are expressed in the formulations (7) and (8) below.

$$Iw(t)=\{D(t)+Wd(t)Wp(t)\}(\cos \phi - \sin \phi) \quad (7)$$

$$Qw(t)=\{D(t)+Wd(t)Wp(t)\}(\cos \phi + \sin \phi) \quad (8)$$

Channel identification code correlation integration section 310 integrates correlation signals IW(t) and QW(t) in a period of M corresponding to channel identification code Wd(t), and amplitude of a reference signal Wp(t) in a bit duration time and outputs integration signals IΣW(t) and QΣW(t) indicative of the integration results respectively to sum of products section 312.

The reason to detect the correlation is explained.

Since an output after the correlation has n times rate that of information data, it is necessary to integrate the outputs to obtain the information data. In detail, when it is assumed that transmission data is "1,0", and a channel identification code is "01010101 . . . " with n times rate that of the transmission data. In this case, the signals change as shown below according to the transmission order.

| | |
|---|---|
| Transmission signal | 10100101 . . . |
| Channel identification code | 01010101 . . . |
| Output after correlation (correlation signal) | 11110000 . . . |
| Information data (reception data) | 1   0   . . . |

As shown above, the outputs after the correlation is 11110000 . . . , which has n times rate that of information data. As a method to obtain the information data, there are two methods of choosing one in four and calculation of the average (integration). However in the case of choosing one in four, there may be the possibility to neglect the good data, which may deteriorate the reception quality. Therefore the integration is generally used to obtain the information data.

Integration signals IΣW(t) and QΣW(t) outputted from channel identification code correlation section 310 are expressed in the formulations (9) and (10) below, $$I\Sigma w(t)=MD(T)\cdot(\cos \phi - \sin \phi) \quad (9)$$

$$Q\Sigma w(t)=MD(T)\cdot(\cos \phi + \sin \phi) \quad (10)$$

where T is a bit duration time.

Reference signal correlation integration section 311 integrates correlation signals Ipn(t) and Qpn(t) over M, and outputs integration signals IΣpn(t) and QΣpn(t) indicative of the integration results to sum of products section 312. The integration is performed to obtain signals with a bit rate. Therefore an output signal from reference signal correlation integration section 311 and an output signal from channel identification code correlation integration section 310 have the same bit rate to demodulate the information data.

Integration signals IΣpn(t) and QΣpn(t) outputted from reference signal correlation integration section 311 are expressed in the formulations (11) and (12) below.

$$I\Sigma pn(t)=M\cdot Wpn(t)\cdot(\cos \phi - \sin \phi) \quad (11)$$

$$Q\Sigma pn(t)=M\cdot Wpn(t)\cdot(\cos \phi + \sin \phi) \quad (12)$$

Finally, the sum of products section 312 calculates the sum of products of integration signals IΣW(t), QΣW(t), IΣpn(t) and QΣpn(t) to generate the demodulated data (information data) expressed in the formulation (13) below.

$$(\text{Demodulated Data})=2M^2 Wpn(t)D(t) \quad (13)$$

As described above, a base station spreads the transmission data with a reference signal to transmit, and a conventional mobile station despreads the received signal with the reference signal and integrates the obtained signals over a duration period. The mobile station multiplies the despread received signal by a channel identification signal and integrates the obtained signals over a duration period. Then the sum of products of the obtained integration values are calculated to demodulate the information data.

Generally a phase difference φ in carries between a base station and a mobile station varies. With respect to the phase difference variation, the primary factor is supposed to be the frequency variation in frequency synthesizer section 304 depending on temperature, and the secondary factor is supposed to be the broadness with a Doppler frequency fD in the power spectrum of a received signal as illustrated in FIG. 4.

The broadness of the spectrum is expressed according to 2fD=2V/λ, and depends on a moving speed of a mobile station v and a wavelength of a transmission wave λ. The faster the moving speed becomes, or the shorter wavelength becomes (the higher Doppler frequency fD becomes), the larger the broadness becomes.

The effect of primary on the phase variation in a short time is neglected because it is caused by temperature changes. Regarding the secondary factor, high Doppler frequency fD affects the phase variation in a short time, while low Doppler frequency fD does not affect it much.

According to the facts described above, in the case where the phase variation caused by the primary factor and the secondary factor is small and integration signals IΣpn(t) and QΣpn(t) outputted from reference signal correlation integration section 311 do not vary much, in other words, reference signal correlation integration outputs do not vary much, it is not necessary to perform the integration processing in reference signal correlation integration section 311.

However, in a conventional configuration illustrated in FIG. 1, the reference signal correlation integration processing is performed during the reference signal correlation integration outputs do not vary much, which results in increases of consumed power.

SUMMARY OF THE INVENTION

It is an object of the present invention to provide a mobile radio terminal apparatus capable of reducing consumed power using a CDMA system.

The mobile apparatus in the present invention comprises a reference signal correlation section for detecting the correlation of a received signal and a reference signal to obtain the correlation data, a reference signal correlation integration section for integrating the correlation data, a level crossing number counter section for counting the number times of the received signal crossing the averaged received signal level to obtain the Doppler frequency caused by fading, and a reference signal correlation integration control section for controlling the operation of the reference signal correlation integration section corresponding to the Doppler frequency.

According to the constitution and method described above, since the reference signal correlation integration control section controls the operation in the reference signal correlation integration section corresponding to the Doppler frequency, the power consumed by the reference signal correlation integration section can be reduced compared to the conventional case where the operation is always performed.

DETAILED DESCRIPTION OF THE PREFERRED EMBODIMENT

A mobile radio terminal apparatus using a CDMA system in the embodiments of the present invention is explained with reference to drawings below.

(First Embodiment)

Figure 1:
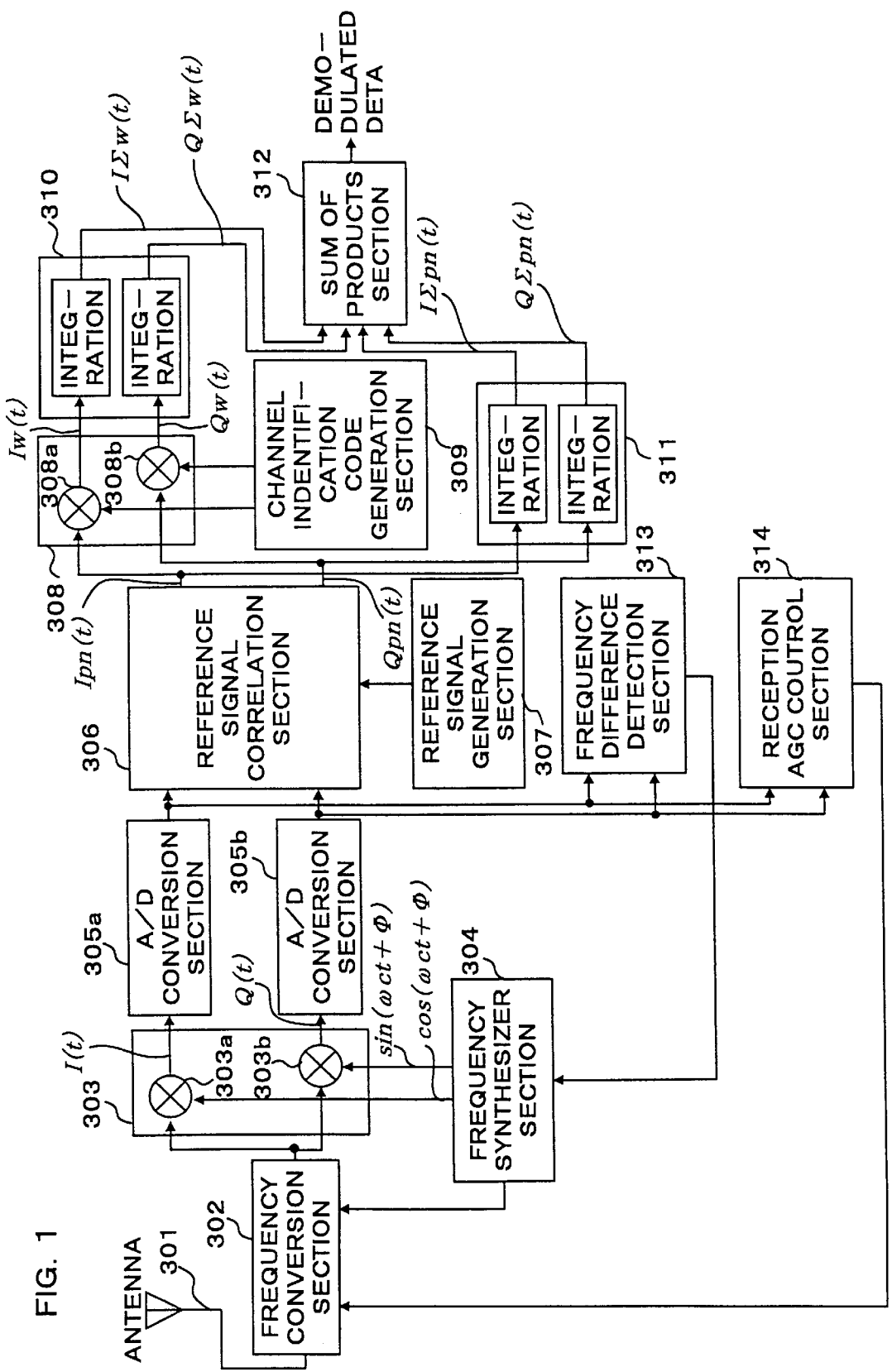
FIG. 1 is block diagram of a conventional mobile radio terminal apparatus using a CDMA system.
Figure 2:
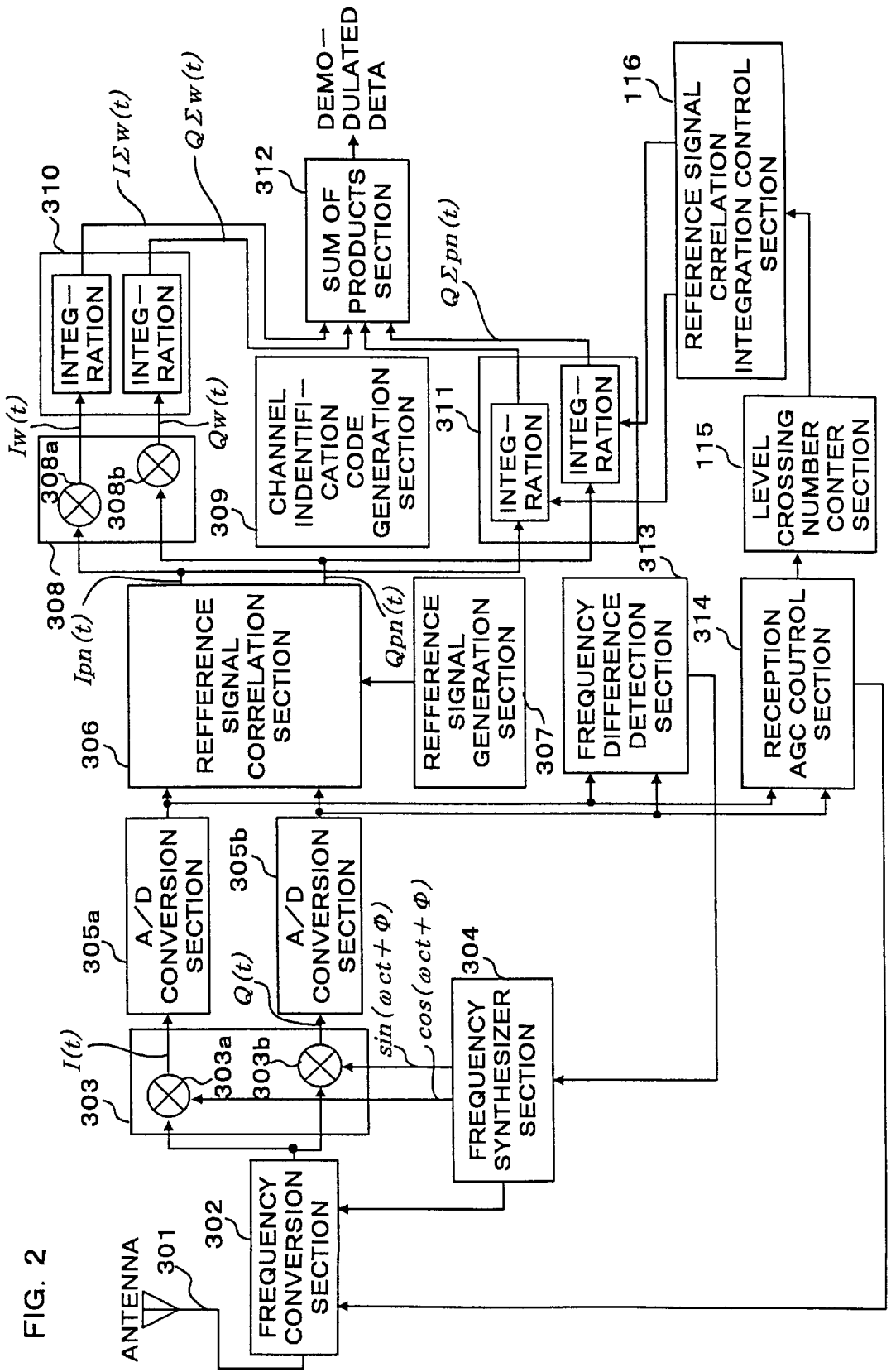
FIG. 2 is a block diagram of configuration of a mobile radio terminal apparatus using a CDMA system in the first embodiment of the present invention.

FIG. 2 is a block diagram of a configuration of a mobile radio terminal apparatus using a CDMA system in the first embodiment of the present invention. In FIG. 2, the same sections as those in FIG. 1 have the same symbols in FIG. 1 and the explanation is omitted.

In the apparatus of the first embodiment of the present invention, level crossing number counter section 115 and reference signal correlation integration control section 116 are further prepared in a conventional configuration.

A received signal is inputted to frequency conversion section 302 via antenna 301. Frequency conversion section 302 multiplies the received signal by a frequency outputted from frequency synthesizer section 304 for the frequency conversion of the received signal to an intermediate frequency band from a radio frequency, and outputs the obtained signal to quadrature demodulation section 303.

Quadrature demodulation section 303 multiplies in EXOR circuits 303a and 303b the frequency converted received signal by a cos (ωct+φ) signal and a sin (ωct+φ) signal respectively to perform the low pass filtering processing, and outputs the obtained analogue I channel baseband signal I(t) and Q channel baseband signal Q(t) to A/D conversion sections 305a and 305b respectively.

A/D conversion sections 305a and 305b convert the analogue baseband signals I(t) and Q(t) into digital signals, and outputs the obtained digital signals to reference signal correlation section 306, frequency difference detection section 313, and reception AGC control section 314.

Reference signal correlation section 306 detects the correlation of each of digital baseband signals I(t) and Q(t) with reference signals PNi(t) and PNq(t) generated in reference signal generation section 307 respectively. That is, the correlation of the received signal with each of reference signals PNi(t) and PNq(t) is detected, and the obtained correlation signals Ipn(t) and Qpn(t) are outputted to channel identification code correlation section 308 and reference signal correlation integration section 311.

Channel identification code correlation 308 multiplies in EXOR circuits 308a and 308b correlation signals Ipn(t) and Qpn(t) with channel identification code Wd(t) generated in channel identification code generation section 309 to detect the correlation. That is, the correlation of the received signal with channel identification code Wd(t) is detected, and the obtained correlation signals IW(t) and QW(t) are outputted to channel identification code correlation integration section 310.

Channel identification code correlation integration section 310 integrates correlation signals Ipn(t) and Qpn(t) separately over a period of M corresponding to channel identification code Wd(t) and amplitude of reference signal Wp(t) in a bit duration of the information data, and outputs integration signals IΣW(t) and QΣW(t) each indicative of the obtained correlation result to sum of products section 312.

And reference signal correlation integration section 311 integrates correlation signals Ipn(t) and Qpn(t) over M, and correlation signals IΣpn(t) and QΣpn(t) each indicative of the obtained correlation result to sum of products section 312.

Sum of products section 312 calculates the sum of products of IΣW(t), QΣW(t), IΣpn(t) and QΣpn(t) to generate the demodulated data.

And frequency difference detection section 313 detects the phase difference in carriers between a base station and a mobile station using each of digital baseband signals I(t) and Q(t), and adjusts the frequency in frequency synthesizer section 304 to a predetermined value using a control value for canceling the phase difference.

Reception AGC control section 314 calculates the time average of each of digital baseband signals I(t) and Q(t) to obtain a received signal level (averaged received signal level), and outputs a reception AGC control level to keep the averaged received signal level constant to frequency conversion section 302 while outputting the averaged received signal level to level crossing number counter section 115.

Level crossing number counter section 115 further calculates the long-time average of the averaged received level, and counts the number of times of a short-time averaged received signal level crossing a long-time averaged received signal (level crossing times) in a certain period time. The obtained counted value indicates the Doppler frequency, and is outputted to reference signal correlation integration control section 116.

Reference signal correlation integration control section 116 controls the processing in reference signal correlation integration section 311 based on the counted value indicative of the Doppler frequency.

As described in the conventional configuration, when the Doppler frequency is low, since it does not affect a phase difference of carriers, a reference signal correlation integration output does not vary much and it is not necessary to perform the integration processing in reference signal correlation integration section 311.

That is, when a counted value indicative of the Doppler frequency is within the range in which the Doppler frequency does not affect the phase difference in carriers between a base station and a mobile station, reference signal correlation integration control section 116 controls reference signal correlation section 311 to suspend the processing.

When the suspend control is performed, reference signal correlation integration section 311 outputs the previous reference signal correlation integration values of integration signals IΣpn(t) and QΣpn(t) to sum of products section 312, and sum of products section generates demodulated data using the previous values.

For instance, when it is assumed that level crossing number counter section 115 decides that the Doppler frequency is 4 Hz, which corresponds to about 5 Km/h when a carrier frequency is 900 MHz), and a bit rate of the information symbol is 19.2 Kbps, the phase difference between a base station carrier and a mobile station carrier is 0.0013 rad. The 0.0013 rad of phase difference corresponds to 0.01 dB of phase difference amount (cos φ–sin φ) included in integration signals IΣW(t), QΣW(t), IΣpn(t) and QΣpn(t). When the phase difference amount (cos φ–sin φ) should be within 0.5 dB, reference signal correlation integration control section 116 controls reference signal correlation integration section 311 to perform the reference signal correlation integration processing once in about forty symbols when the Doppler frequency is 4 Hz.

According to the first embodiment as described above, level crossing number counter section 115 counts the number of times of a short-time averaged received signal level crossing a long-time averaged received signal level, in other words, the number of times of a received signal crossing an averaged received signal level, to obtain the Doppler frequency. Reference signal correlation integration control section 116 controls the processing in reference signal correlation integration section 311 based on the Doppler frequency. Thus, it is possible to reduce the power consumed by reference signal correlation integration section 311 for the excess processing.

(Second Embodiment)

Figure 3:
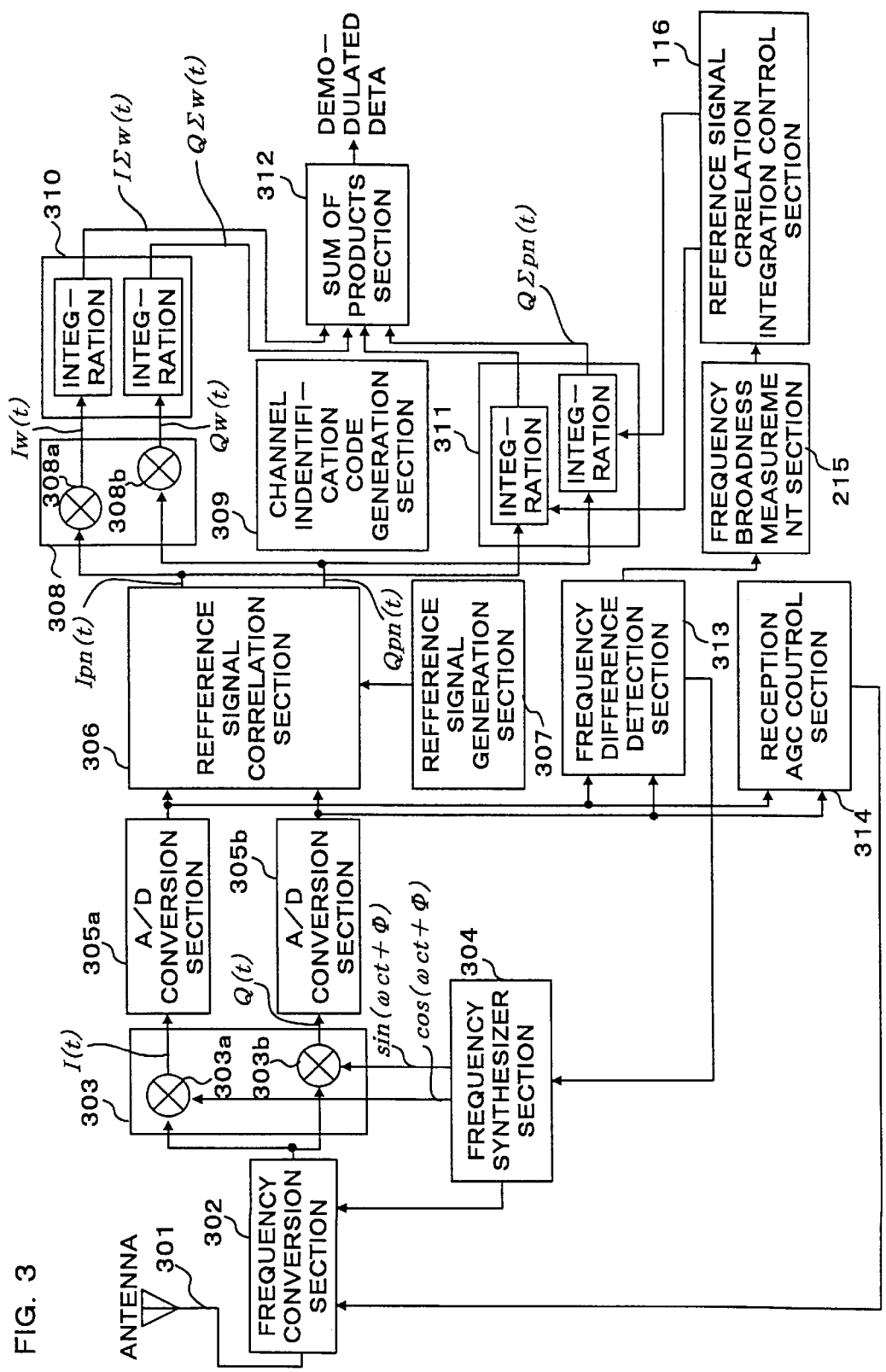
FIG. 3 is a block diagram of a configuration of a mobile radio terminal apparatus using a CDMA system in the second embodiment of the present invention.
Figure 4:
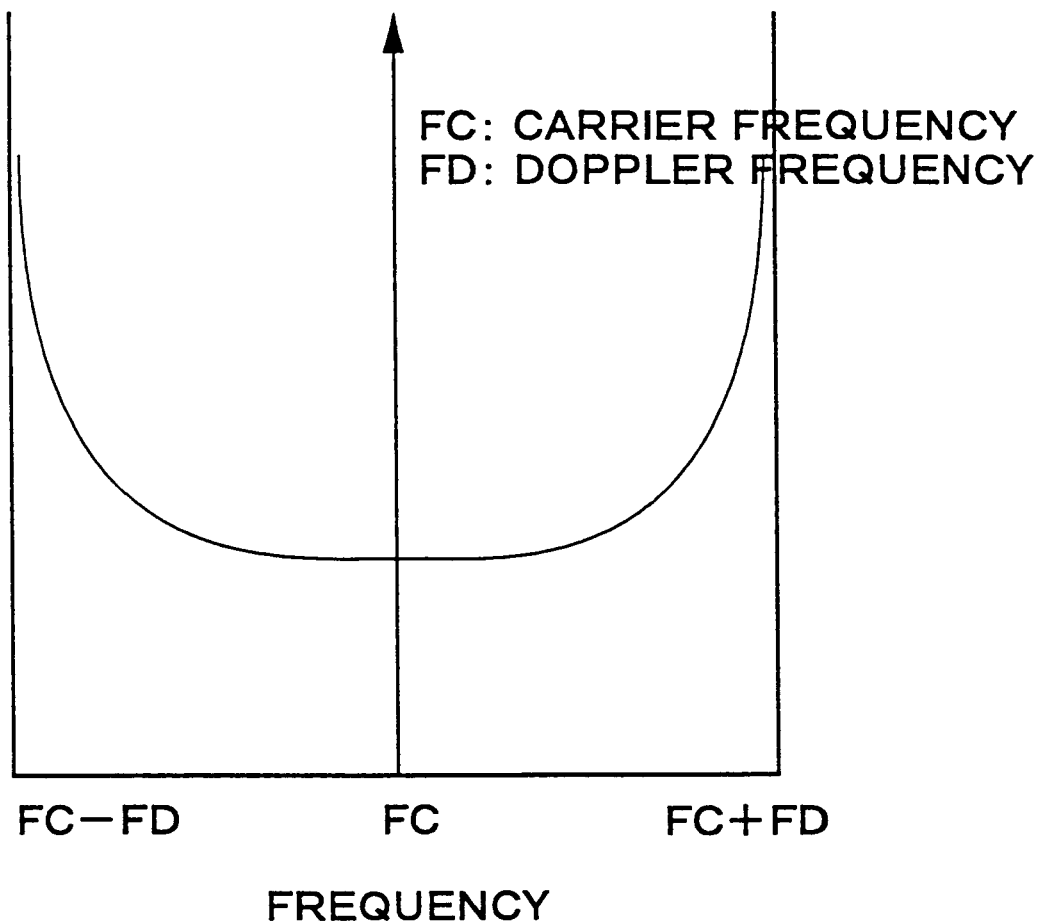
FIG. 4 is a distribution diagram of power spectrum caused by fading.

FIG. 3 is a block diagram of a configuration of a mobile radio terminal apparatus using a CDMA system in the second embodiment of the present invention. In FIG. 3, the same sections as those in the first embodiment have the same symbols in FIG. 2, and the explanation is omitted. And in FIG. 3, the symbols illustrated in FIG. 2 are also omitted.

In a mobile radio terminal apparatus in the second embodiment of the present invention, frequency broadness measurement section 215 is prepared in reference signal correlation integration section 116 and frequency difference detection section 313 that are explained in the first embodiment of the present invention.

Frequency difference detection section 313 detects a phase difference between a base station carrier and a mobile station carrier. The phase difference in carriers indicates a real phase difference when a mobile station stops moving. However it is known that while a mobile station is moving, the frequency distribution indicates the broadness based on the Doppler frequency.

Frequency broadness measurement section 215 measures the absolute value of a phase difference in carriers detected in frequency difference detection section 313 in several levels to obtain the carrier frequency broadness, then outputs the obtained absolute value of carrier frequency broadness to reference signal correlation integration control section 116 as the Doppler frequency. In addition, it may be preferable to frequency broadness measurement section 215 has the function for detecting a phase difference in carriers.

Herein, an explanation is given to the reason why the absolute value of a carrier frequency broadness becomes the Doppler frequency. The Doppler frequency is caused by the Doppler effect. The Doppler effect in sounds are well known. When a person who stops moving hears a sound generated from a moving object, he/she hears higher-pitched sound than a real sound in the case where the object is moving close, and lower-pitched sound than a real sound in the case where the object is moving away.

A high-pitched sound indicates that the frequency shifts higher, and a low-pitched sound indicates that the frequency shifts lower. The Doppler frequency is a frequency shift that is calculated from the relation in moving speed and signal wavelength on a transmission signal when a mobile station is moving. This phenomenon occurs in all signals from a base station to a mobile station (including multi-path propagation), and the received signal frequency indicates a broad frequency spectrum in which the maximum broadness is determined by the Doppler frequency.

Reference signal correlation integration control section 116 controls the processing in reference signal correlation integration section 311 based on the absolute value of the Doppler frequency in the same manner as the first embodiment.

Thus, according to the second embodiment. frequency broadness measurement section 215 obtains the Doppler frequency by measuring the absolute value of a carrier frequency broadness using the phase difference in carriers detected in frequency difference detection section 313. Reference signal correlation integration control section 116 controls the processing in reference signal correlation integration section 311 based on the obtained Doppler frequency. Thus, it is possible to reduce the power consumed in reference signal correlation integration section 311 for the excess processing.

As described above, according to the present invention, since a reference signal correlation integration control section controls the processing in a reference signal correlation integration section based on the Doppler frequency obtained in level crossing number counter section, it is possible to reduce the consumed power in a reference signal correlation integration section than in a conventional section that always operates. Accordingly, it is possible to reduce the consumed power in a mobile radio terminal apparatus.

What is claimed is:

1. A reception apparatus comprising:
   moving speed detection means for detecting a moving speed of a mobile station apparatus;
   correlation means for detecting the correlation of a received signal with a reference signal to obtain correlation data;
   an integrator for integrating said correlation data; and
   integration control means for controlling an operation in said integrator,
   wherein said moving speed detection means comprises calculation means for calculating a Doppler frequency caused by fading, and means for detecting the moving speed using the Doppler frequency and a carrier frequency, said calculation means calculates the Doppler frequency caused by fading using the number of times of a signal level of the received signal crossing an averaged received level.

2. The reception apparatus according to claim 1, wherein said integration control means controls said integrator to suspend the operation in the case where the moving speed is lower than a predetermined value.

3. The reception apparatus according to claim 1, wherein when said integration control means controls said integrator to suspend the operation, said integrator holds an output of integration data obtained just before said integrator suspends the operation.

4. A mobile station apparatus in radio communicating a signal spectrum spread with a spreading code with a base station apparatus, said mobile station apparatus comprising the reception apparatus according to claim 1, where an operation of integrating the correlation data of the received signal with the reference signal is controlled based on moving speed information.

5. An information mode terminal apparatus in radio communicating a signal spectrum spread with a spreading code with a base station apparatus, said information mode terminal apparatus comprising the reception apparatus according to claim 1, where an operation of integrating the correlation data of the received signal and the reference signal is controlled based on moving speed information.

6. A reception apparatus comprising:
   moving speed detection means for detecting a moving speed of a mobile station apparatus;
   correlation means for detecting the correlation of a received signal with a reference signal to obtain correlation data;
   an integrator for integrating said correlation data; and
   integration control means for controlling an operation in said integrator, wherein said moving speed detection means comprises means for calculating a frequency broadness using a difference between a carrier frequency used in a base station and a carrier frequency of a mobile station apparatus obtained from the received signal, and means for detecting the moving speed using the frequency broadness and each carrier frequency.

7. The reception apparatus according to claim 6, wherein said integration control means controls said integrator to suspend the operation when the moving speed is lower than a predetermined value.

8. The reception apparatus according to claim 6, wherein when said integration control means controls said integrator to suspend the operation, said integrator holds an output of integration data obtained just before said integrator suspends the operation.

9. A mobile station apparatus in radio communicating a signal spectrum spread with a spreading code with a base station apparatus, said mobile station apparatus comprising the reception apparatus according to claim 6, where an operation of integrating the correlation data of the received signal with the reference signal is controlled based on moving speed information.

10. An information mode terminal apparatus in radio communicating a signal spectrum spread with a spreading code with a base station apparatus, said information mode terminal apparatus comprising the reception apparatus according to claim 6, where an operation of integrating the correlation data of the received signal and the reference signal is controlled based on moving speed information.

11. A reception method comprising:
calculating a Doppler frequency caused by fading using the number of times of a received signal crosses an averaged received level, measuring a moving speed of a mobile station apparatus using the Doppler frequency and a carrier frequency, and controlling an operation of integrating correlation data of a received signal with a reference signal based on the measured moving speed.

12. A reception method comprising:
calculating a frequency broadness using a difference between a carrier frequency used in a base station and a carrier frequency of a mobile station apparatus obtained from a received signal;

measuring a moving speed using the frequency broadness and each carrier frequency; and controlling an operation of integrating correlation data of the received signal with a reference signal based on the measured moving speed.

* * * * *